UNITED STATES PATENT OFFICE.

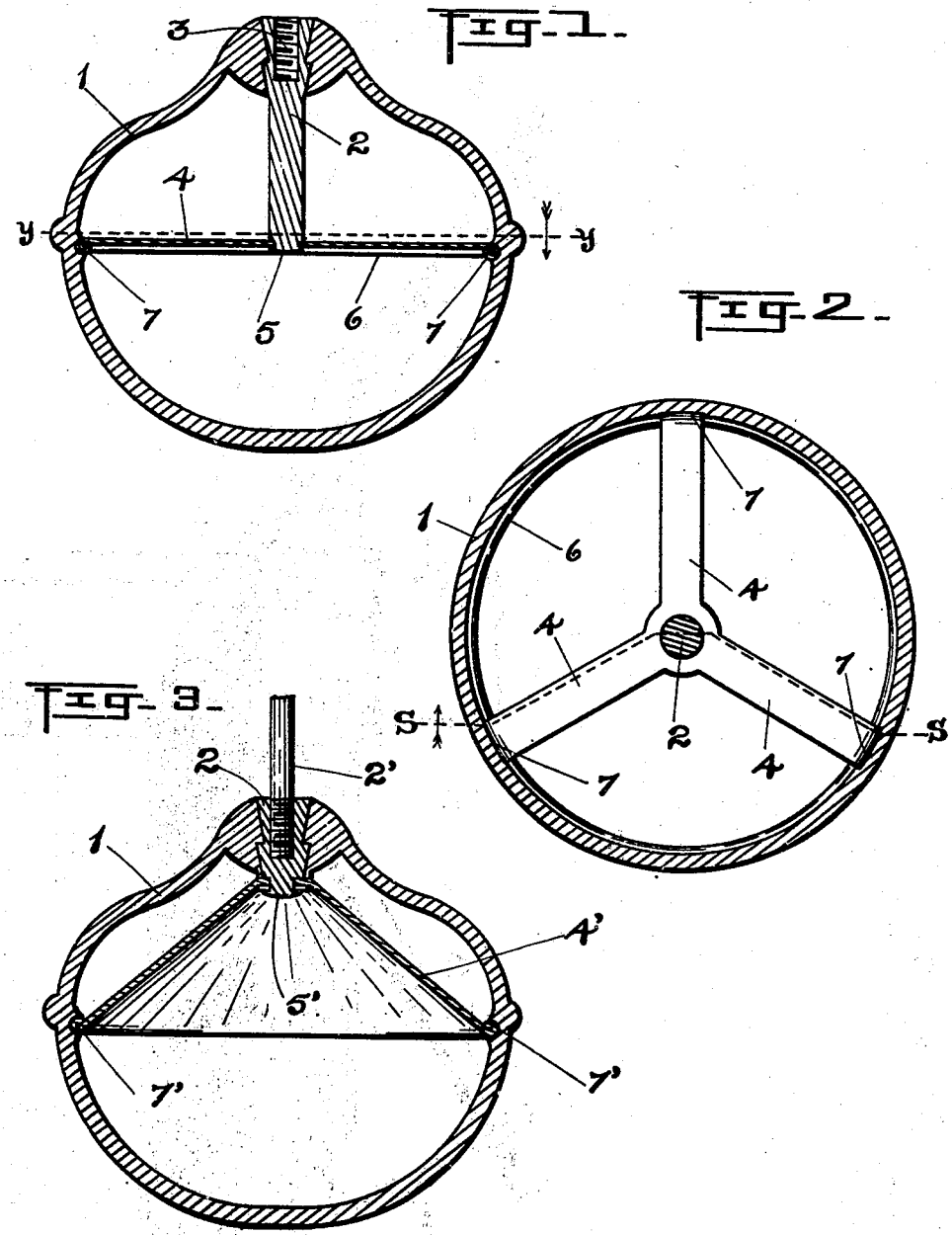

LOUIS A. CORNELIUS, OF GRAND RAPIDS, MICHIGAN.

VALVE-FLOAT.

992,546.  Specification of Letters Patent.  Patented May 16, 1911.

Application filed February 27, 1909. Serial No. 480,476.

*To all whom it may concern:*

Be it known that I, LOUIS A. CORNELIUS, a citizen of the United States, residing at Grand Rapids, in the county of Kent and State of Michigan, have invented new and useful Improvements in Valve-Floats, of which the following is a specification.

In closet tanks and other tanks designed to be automatically filled, it is customary to use, in connection with the outlet pipe, a valve consisting essentially of a rubber or elastic bulb, which, being full of air, will normally float, but which is of such weight and structure that, as the tank empties, this bulb will be drawn into and seat itself against the opening in the escape pipe, and will thereby, acting as a valve, hold this opening closed until sufficient force is exerted to raise it from this position. The ordinary rubber bulb or float, by long use, or under special stress, tends to become distorted in shape so that it may not perfectly fit the opening, and it is important to retain this bulb permanently in its substantially normal shape while not interfering with the flexibility or elasticity which permits it to have its characteristic action. Various devices have been used for this purpose, but I find my device, hereinafter described, especially efficacious, simple and cheap.

I accomplish the desired object by the form of construction shown in the accompanying drawings.

Figure 1 is a vertical cross-section of a rubber float bulb having my device attached, and taken on the line S—S of Fig. 2. Fig. 2 is a horizontal section upon the line Y—Y of Fig. 1. Fig. 3 is a vertical cross-section showing a modified form of construction.

In these drawings the numeral 1 represents the wall of the rubber bulb molded or cast in the customary form.

2 is a metal rod having at its upper end the screw-thread 3, which I have shown as carried by an internal open-ended chamber, and having, also, shoulders, or other means for engaging and being held by a surrounding body of rubber.

4 is a horizontal spider, which I have shown as having three arms, and at its center riveted or otherwise attached to the lower end 5 on the rod 2.

6 is a ring of wire, or other suitable material, by which ring the spider is carried. As a convenient form of engagement, I have shown the ends of the spider arms turned over and around the ring, as at 7.

I have shown the rod 2 as permanently attached to the spider at its central portion, and as terminating at the exterior of the bulb. Obviously, however, the essential thing is that this rod should be suitably connected to the ring, and that it should afford means of connection with the exterior operating devices.

The metallic part of my device being constructed by assembling the ring, the spider and the rod, I insert the same in the rubber bulb in the process of formation, and the parts then take the position shown in Fig. 1. I have shown the customary shoulders, or corrugations, on the upper end of this rod, which serves as a spud, and the customary enlarged body of solid rubber surrounding the same and, if desired, vulcanized thereto; but it is apparent that in my construction the purpose of this enlarged body of solid rubber, and possibly vulcanized connection, is largely obviated, since the pull of the lifting rod is exerted upon the rubber bulb through the ring 6 at the central portion of the bulb and it is quite impossible for the rod or spud to be lifted or worked loose from its position by the force of the lifting rod which makes screw-threaded engagement with the thread 3.

I find it desirable to construct, as shown, a slight interior groove on the face of the rubber bulb at about its center, in which groove the ring 6 may set itself, and in such case I provide a compensating thickness of rubber upon the outside of the bulb, but this groove and this exterior rib constitute no part of the invention, and I do not describe them in greater detail. The ring 6 will normally seat itself at the central and largest portion of the bulb if the parts are properly proportioned and without the aid of the groove just referred to. This ring 6 prevents the bulb from collapsing, and at the same time does not interfere with the flexibility or moderate distortion of the lower portion of the bulb, which may; therefore, adjust itself to the valve seat as perfectly as if the interior ring was not present; but the horizontal diameter of the bulb can not be permanently modified by a compensating increase in the vertical diameter as might otherwise happen; and, at the same time, the positive connection between the exterior lifting rod, not shown, and the central ring, makes certain the lifting of the bulb upon very slight lifting of the external operating parts.

In Fig. 3 I have shown a modified or developed form of the device. The rod 2 has taken the form of the ordinary spud in screw-threaded engagement with the lifting rod, which, in this figure, I have shown by the numeral 2'. The spider 4 has been developed into a continuous cone, and the ring 6 and the inclosing curved ends 7, are developed into the roll 7', the entire lower edge of the cone being turned over or rolled up so as to make a continuous ring, and this ring, being stiffened by the presence of the cone in every part, the ring or roll may be much lighter than would otherwise be necessary. The spud or rod 2 is attached to this cone by having the lower end thereof, 5', upset, or riveted, or in any other suitable way. This form of construction has all the advantages already described, and has the additional merit that the entire spider and ring device may be struck or stamped up very cheaply and simply. There is also provided a measure of reinforcing for the entire upper half of the rubber bulb, and any tendency to collapse caused by the substantial raising of the bulb against a considerable pressure of water is met and resisted by this inner reinforcing shell, the extent and operation of the resistance being determined by the distance or space, if any, permitted between the shell or cone 4' and the surrounding portion of the rubber bulb 1.

I call attention to the fact that the cone-shaped shell shown in Fig. 3 is a development of the spider shown in Fig. 2, and that the cone does, in fact, contain the three arms of the spider, as well as other arms.

Having thus described my invention, what I claim to have invented, and desire to secure by Letters Patent, is—

1. In a device of the character described, the combination of a flexible bulb-valve having a valve stem, a rigid ring in the bulb-valve adapted to hold the same against collapsing in the plane of the ring, and a rigid connection, in form a hollow cone, between the ring and the valve stem, the base of said cone being joined to the ring and the apex to the valve stem.

2. In a device of the character described, the combination of a bulb-valve having a valve-stem, a rigid ring in the bulb-valve adapted to hold the same against collapsing in the plane of the ring, said bulb-valve being flexible on either side said ring, and rigid connections between the ring and the valve-stem.

In testimony whereof I have hereunto set my hand in presence of two subscribing witnesses.

LOUIS A. CORNELIUS.

Witnesses:
 MARY S. TOOKER,
 A. C. DENISON.